Sept. 29, 1964 W. W. TAYLOR ETAL 3,150,401

PHONOGRAPH RECORD CLEANER

Filed Jan. 31, 1963

INVENTORS
WILLIAM W. TAYLOR,
RICHARD O. SPENCER
BY THEIR ATTORNEYS
HARRIS, KIECH, RUSSELL & KERN

United States Patent Office 3,150,401

Patented Sept. 29, 1964

3,150,401

PHONOGRAPH RECORD CLEANER

William W. Taylor, 33 Admiralty Drive, Malibu, Calif., and Richard O. Spencer, 640 Resolano Drive, Pacific Palisades, Calif.

Filed Jan. 31, 1963, Ser. No. 255,347
2 Claims. (Cl. 15—311)

This invention relates generally to phonograph equipment and more particularly to a structure designed for cleaning surfaces of phonograph records to remove the dust therefrom.

Remarkable advancements have been made in recent years in improving audio-reproduction in the form of hi-fidelity equipment and improved phonograph records. To obtain full advantage of the improved equipment and records, and in particular to obtain full benefit of the hi-fidelity characteristics, the phonograph records used with the equipment must be free of dust.

It is a principal object of this invention to provide a phonograph record cleaner which will automatically clean the surfaces of a phonograph record inserted into the cleaner.

A still further object of the invention is to provide a device of this character having a simple and practical construction which is attractive in appearance and efficient and reliable in operation.

It is a further object of the invention to provide a phonograph record cleaner having a structure which is relatively inexpensive to manufacture and assemble.

It is a further object of this invention to provide a phonograph record cleaner which, because of its simple construction, is relatively maintenance free.

The phonograph record cleaner of the invention comprises a housing having an elongated opening for receiving a phonograph record. Means are provided within the housing for movably supporting the edge of the record to hold the record in a vertical position. Brush means are disposed on opposite sides of the record and in contact therewith. Means are provided for imparting relative movement of the record and brushes to effect a substantially complete brushing of the recording surfaces of the record. The phonograph record cleaner of the invention is provided with a fan closely spaced to each side of the record. Each of the respective fans supports one of the aforementioned brush means which rotates therewith. In the preferred embodiment of the record cleaner of the invention, means are provided for driving the brush supporting fans and for rotating the record to present succeeding dusty portions of the surfaces of the record to the action of the fans and brushes.

Other objects and advantages of the invention will become more apparent from the study of the following specification and the accompanying drawing in which.

Figures 1, 2, 4:
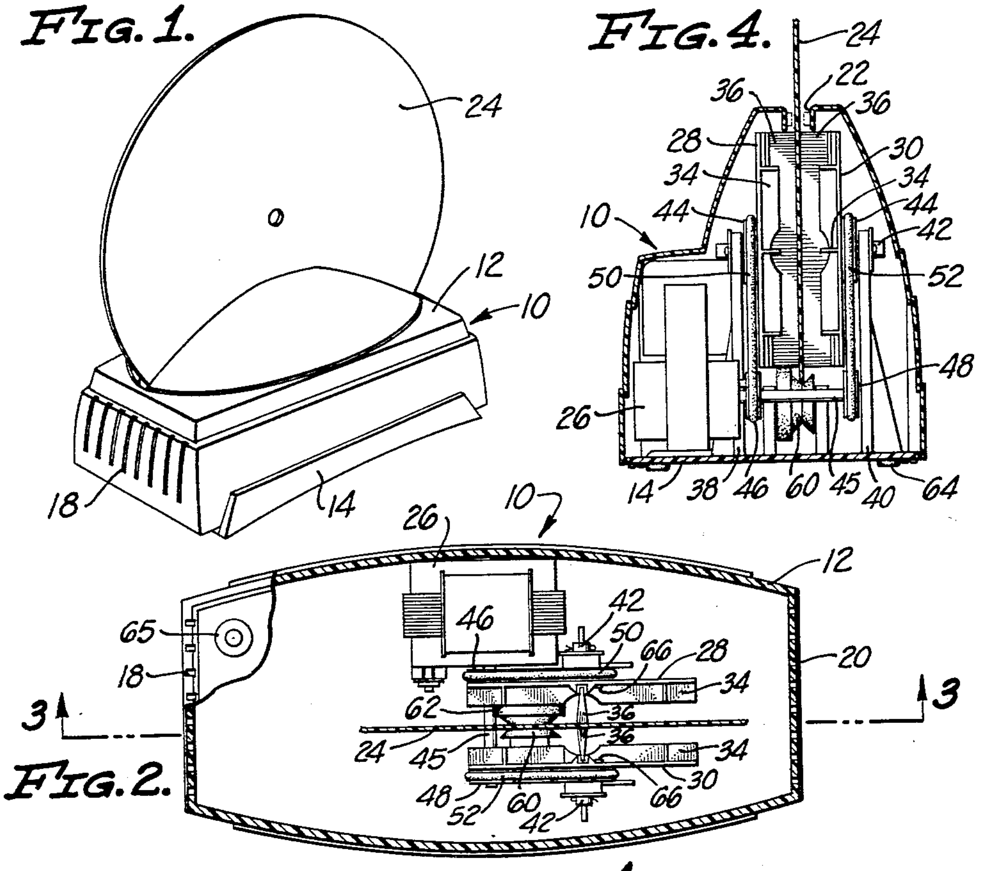
FIG. 1 is a perspective view of a preferred embodiment of a phonograph record cleaner of the invention with a record inserted therein.
FIG. 2 is a horizontal sectional view of the phonograph record cleaner of the invention taken along line 2—2 of FIG. 3 presenting a plan view of the working mechanism of the device housed within the phonograph record shell.
FIG. 4 is a cross-sectional view taken along the irregular line 4—4 of FIG. 3.

The phonograph record cleaner 10 of the invention includes an upper housing or shell portion 12 and a lower housing base portion 14 secured to the upper housing portion 12 by screws 16. The upper housing portion 12 at its opposite ends is provided with vents 18 and 20 in the form of a series of slots for the ingress and egress of air. The upper housing has an elongated slot 22 through which a record 24 is inserted. The upper housing 12 and the lower housing base portion 14 are both made of plastic.

The lower base portion 14 of the record cleaner supports the operating mechanism which includes an electric motor 26 and two exhaust fan assemblies 28 and 30 which are closely spaced to opposite sides of the record 24. Each fan assembly comprises a series of blades 34 and a single brush 36 which has a length equal to the diameter of the fan proper (see FIG. 3). The blades 34 and brush 36 of each fan assembly are attached to a circular disc 37 which disc is provided with a series of vent holes 39. The brush 36 of each of the fan assemblies 28 and 30 engages a recording surface of the record 24, as best seen in FIG. 2. The fan assemblies 28 and 30 are respectively supported by braces 38 and 40 whose lower ends are secured to the upper face of the lower base portion 14 of the record cleaner. Each fan assembly 28 and 30 comprises a short stub shaft 42 which at its inner end supports the fan proper and which intermediate of its length carries a driven pulley 44.

The motor 26 has a cantilever drive shaft 45 which along its length is provided with two spaced drive pulleys 46 and 48. The respective drive pulleys 46 and 48 are coupled through belts 50 and 52 to the respective driven pulleys 44 of the two fan assemblies 28 and 30. Thus, it is seen that the rotation of the drive shaft 45 results in rotation of the two fan assemblies 28 and 30.

Figure 3:
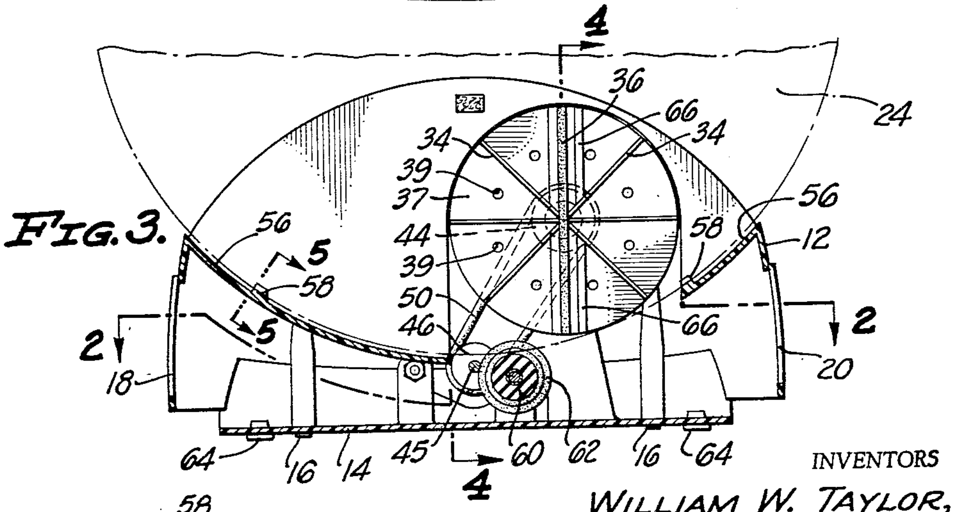
FIG. 3 is a longitudinal sectional view taken along line 3—3 of FIG. 2.
Figure 5:
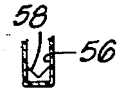
FIG. 5 is a fragmentary sectional view taken from the site of line 5—5 of FIG. 3.

The record 24 rests on opposite sides of the record cleaner mechanism within narrow record chutes 56 and more particularly upon V-shaped record supports 58 as seen in FIGS. 3 and 5. The low point of the record 24 rests on a rubber, V-shaped or grooved pulley 60. The pulley 60 has an integral flange portion 62, also made of rubber, which at its perimeter engages the drive shaft 45. Hence, with rotation of the drive shaft 45 of the motor 26, the rubber pulley 60 rotates and brings about movement of the record 24, thereby presenting succeeding surfaces of the record to the action of the two fan assemblies 28 and 30 and their brushes 36. The dust dislodged by the brushes 36 is exhausted in an air stream through the slots of one of the vents 18 and 20. The lower base portion 14 of the record cleaner 10 is provided with rubber feet 64. The motor 26 is controlled by a switch 65.

In order to drain off static electricity that may collect on the opposite surfaces of the record strips 66 of polonium impregnated material are held to the inner faces of the fan assemblies 28 and 30. The polonium is radioactive and serves as an ionizing agent to change the polarity of the static electricity, thus neutralizing the record. In some applications, a relatively small patch of the polonium material will be adequate.

Although an exemplary embodiment of the invention has been disclosed herein for purposes of illustration, it will be understood that various changes, modifications, and substitutions may be incorporated in such embodiment without departing from the spirit of the invention as defined by the claims which follow.

We claim:

1. A phonograph record cleaner comprising:

a housing having an elongated opening adapted to receive a phonograph record, said housing being vented to provide for the ingress and egress of air;

means within said housing adapted to movably support the edge of the record in a vertical position;

a fan assembly closely spaced to each side of the record to be cleaned with each assembly including a disc having radially extending and perpendicularly disposed blades on the respective inner faces of the two discs, and a brush fixed to and extending diametrically across the respective inner face of each disc, said brushes being adapted to engage a phonograph record placed between said two fan assemblies; and means for driving said fan assemblies and for rotating the phonograph record to present succeeding portions of said record to the action of the fans and brushes.

2. A phonograph record cleaner comprising:

a housing having an elongated opening adapted to receive a phonograph record, said housing being vented to provide for the ingress and egress of air;

means within said housing adapted to movably support the edge of the record in a vertical position;

a fan assembly closely spaced to each side of the record to be cleaned with each assembly comprising a disc with a plurality of vent holes therethrough and having radially extending and perpendicularly disposed blades on the respective inner faces of the two discs, and a brush fixed to and extending diametrically across the inner face of each disc, said brushes being adapted to engage a phonograph record placed therebetween; and means for driving said fan assemblies and for rotating the phonograph record to present succeeding portions of said record to the action of the fans and brushes, said means including a rubber, grooved pulley which is adapted to receive an edge of the record.

References Cited in the file of this patent

UNITED STATES PATENTS

| | | |
|---|---|---|
| 1,770,935 | Lochman | July 22, 1930 |
| 2,595,226 | Cookson | May 6, 1952 |
| 3,005,223 | Taylor et al. | Oct. 24, 1961 |
| 3,077,622 | Murphy | Feb. 19, 1963 |

FOREIGN PATENTS

| | | |
|---|---|---|
| 58,402 | Norway | Sept. 20, 1937 |